Sept. 9, 1958 R. M. HELLER 2,851,079
FREE SPINNING NUT AND WASHER ASSEMBLY WITH RESILIENT SEALENT
Filed Oct. 25, 1954
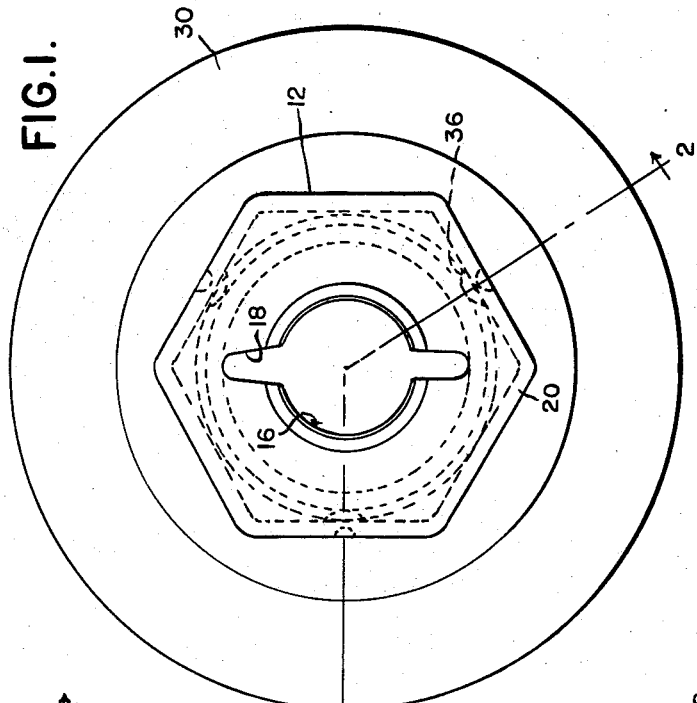
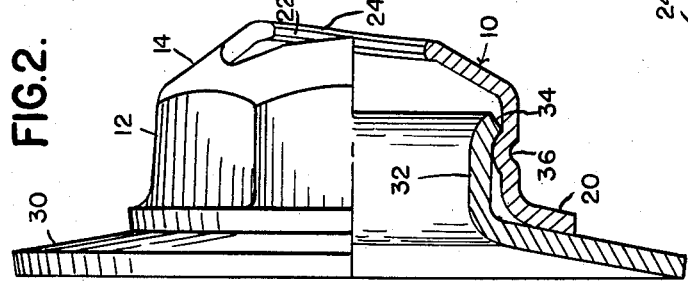
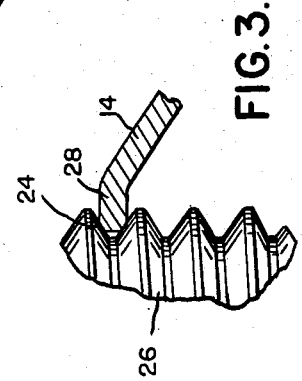
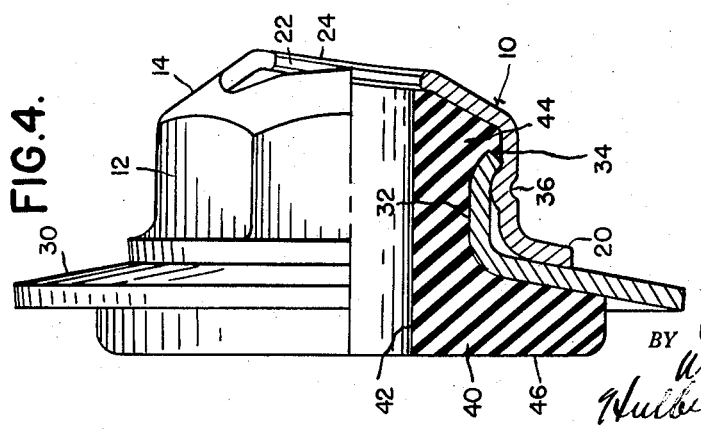
INVENTOR.
BY ROBERT M. HELLER
ATTORNEYS United States Patent Office 2,851,079
Patented Sept. 9, 1958

2,851,079

FREE SPINNING NUT AND WASHER ASSEMBLY WITH RESILIENT SEALANT

Robert M. Heller, Birmingham, Mich., assignor to Watts Electric & Mfg. Co., Birmingham, Mich., a corporation of Michigan Application October 25, 1954, Serial No. 464,317

5 Claims. (Cl. 151—7)

The present invention relates to a nut, and more particularly, a sheet metal nut which may have combined therewith yieldable sealing material and/or a washer with respect to which the nut is freely rotatable while retained in assembled relation therewith.

It is an object of the present invention to provide a sheet metal nut having a generally circular bolt receiving opening therethrough, the opening being provided with a lateral extension, edge portions of the nut surrounding the opening being helically formed and preferably having the corners of the edge portions beveled to produce approximately true thread form.

It is a further object of the present invention to provide a sheet metal nut in the form of a cup having a bottom wall including an outer generally conical portion provided with a central generally circular opening and including a lateral extension, edge portions of the bottom wall of the cup being helically formed and preferably having the corners of the edge portions beveled to produce approximately true thread form.

It is a further object of the present invention to provide a nut of the type described in the preceding paragraph in which the cup is provided with yieldable sealing material having a bolt receiving opening therethrough.

It is a further object of the present invention to provide a sheet metal nut in the form of a cup having a transverse wall provided with an opening the edge portions of which are formed into thread form in combination with a washer having a tubular portion received within the cup and means retaining the tubular portion of the washer within the cup while providing for relatively free spinning rotation between the nut and washer.

It is a further object of the present invention to provide a combination nut and washer as described in the preceding paragraph in which the combined nut and washer is provided with yieldable sealing material normally extending beyond the combination nut and washer for direct engagement with an article on which the nut is used.

Other objects and features of the invention will become apparent as the description proceeds, especially when taken in conjunction with the accompanying drawings, wherein:

Figure 1 is a plan view of a free spinning nut and washer assembly constructed in accordance with the present invention.

Figure 2 is a section on the line 2—2, Figure 1.

Figure 3 is a fragmentary sectional view showing the coaction between the nut and the thread of a standard bolt.

Figure 4 is a fragmentary sectional view of the combined nut and washer provided with yieldable sealing material.

In accordance with the present invention the nut proper illustrated generally at 10, comprises a cup having side walls 12 which as best seen in Figure 1, are formed into non-circular cross-section for engagement with a wrench or other tool. In the illustrated embodiment of the invention the sides of the cup are shaped to form a hexagon. The transverse or bottom wall of the cup includes a generally conical portion 14 provided with an opening 16. The opening 16, as best illustrated in Figure 1, is of generally circular configuration as viewed from the top but includes lateral relatively narrow extensions or slots 18. At the top of the cup the material thereof is bent outwardly to provide a generally outwardly extending flange 20. The lateral narrow extensions or slots 18 of the opening 16 separate the opening into two generally arcuate edge portions 22 and in the production of this nut, the generally arcuate edge portions 22 are stamped into a helical configuration, as best illustrated at 22 in Figure 2. It will be appreciated that at least one of the slots 18 the adjacent edge portions are not a continuation of the same helicoidal surface, which permits entry of the end of one of the helicoidal edge portions into the thread of a bolt.

In Figure 1 it will be observed that two of the slots 18 are illustrated. In this case the arcuate edge portions 22 may be formed as two parts of a single continuous helicoidal surface in which case the nut will be equivalent to a single start threaded nut. Alternatively, the two edge portions 22 may be part of two different helicoidal surfaces in which case the nut will be equivalent to a two-start threaded nut. It will of course be obvious that in certain cases more than two slots 18 may be formed and the edge portions intermediate the slots may be caused to lie in more than two continuous helicoidal paths, in which case the nut will be equivalent to a threaded nut having more than two starts.

In accordance with the present invention the corners of the edge portions 22 are beveled as indicated at 24. In Figure 3 the coaction between the beveled surfaces 24 and the threads of a bolt 26 is clearly apparent. By this arrangement the edge portions 22 of the nut are caused to closely approximate true thread form so that the engagement with the conventional threads of a nut is most efficient.

Attention is directed to another important feature of the present invention. As previously described, the bottom transverse wall of the cup of the nut was described as including the conical portion 14. Intermediate the conical portion 14 and the hole or opening 16 in the nut, is a straight portion 28 which in section as illustrated in Figure 3, appears to occupy a plane perpendicular to the axis of the nut. In fact, the flat portion 28 extends in a generally helical path. This arrangement induces deformations under torque load causing pinching or binding action toward the root of the thread.

While the nut as just described is a useful article of commerce, it is also contemplated that the nut may be associated with a washer 30. This washer includes a tubular portion 32 extending up into the cup of the nut and has its inner end turned outwardly as indicated at 34. Some of the side walls of the nut are dimpled inwardly as indicated at 36 to engage below the outwardly turned portion 34 of the washer neck. This has the effect of retaining the neck in the cup and thus providing an interlock between the washer and nut. At the same time, this arrangement permits relatively free rotation between the washer and nut so that the nut may spin freely on the washer.

This nut and washer combination may be used as described but preferably it is provided with a sealing element 40, as illustrated in Figure 4. The material of this sealing element may completely fill the cavity within the tubular neck of the washer and the cup of the nut except for an axially extending opening 42 in alignment with the bolt receiving opening in the nut. Suitable yieldable or resilient plastic material or rubber may be employed as the sealing element. Since the sealing element may be formed by deposit in the nut-washer combination, it is unnecessary to cause adhesion between contacting surfaces of the sealing element and the washer or nut. Portions of the sealing element such as indicated at 44, interlock behind inwardly facing surfaces of the nut or washer and thus serve to retain the sealing element in place.

Preferably, the sealing element includes a face or surface 46 which extends outwardly beyond the surface of the washer so that the sealing element is first brought into direct engagement with the surface of the part held in place by the nut. As the nut is tightened down the sealing element is compressed and provides a firm effective seal. This is particularly true where the opening 42 through the sealing element may be nominally somewhat smaller than the size of the bolt for which the nut is designed so that the sealing element tends to enter into and provide an effective seal with the threads of the bolt.

It is also possible to form a useful article by providing a similar sealing element directly in the hollow cup of the nut without employing a washer in conjunction therewith. In such case the sealing element will be retained in place by the inwardly formed dimples 36 in the side walls of the cup.

It will be observed that the washer 30 is also formed of sheet metal and is conically dished with the result that it operates as a spring washer.

The metallic parts of the nut and washer are formed entirely of sheet metal so that no special threading or tap operation is required. Instead, the sheet metal forming the nut has the opening 16 formed therein and is drawn or stamped into the cup formation illustrated. This stamping operation shapes the edge portions 22 surrounding the opening into the required helicoidal path. The beveled surfaces 24 of the edge portions 22 may be provided when forming the opening 16.

The partially annular area directly adjacent the inner edge of the opening is flattened as above described to induce deformation under torque causing a pinching or binding action in the thread and thus serves to insure that the nut tends to be self locking on the bolt.

The nut 10 and the washer 30 may be pre-shaped separately and snapped together by axial pressure. The nut and washer are preferably shaped so that the outwardly turned edge 34 of the tubular portion of the nut does not bind on the inwardly extending dimples 36 but instead provides sufficient looseness so that the nut is free spinning on the spring washer.

The pinching or self-locking action is further enhanced by the provision of the opposed lateral extensions or slots 18. As the nut is tightened down on the work the material surrounding the opening and forming the thread of the nut tends to be forced inwardly so as to provide a pinching action on the bolt. The provision of the flat portions 28 surrounding the opening further enhance the deformation under normal torque pressure causing a pinching or binding action within the thread of the bolt.

Nuts of this type are particularly useful because they may be rapidly produced at a minimum of expense and yet serve as efficiently as the more expensive solid nuts having cut or tapped threads. When associated with the washer as illustrated herein a new and useful combination of nut and washer is provided. Further, when provided with the sealing element as herein illustrated, either with the nut alone or in conjunction with the nut and washer combination, a still further useful and novel combination is produced.

The drawings and the foregoing specification constitute a description of the improved free spinning nut and washer assembly in such full, clear, concise and exact terms as to enable any person skilled in the art to practice the invention, the scope of which is indicated by the appended claims.

What I claim as my invention is:

1. A nut comprising two telescopically arranged relatively rotatable sheet metal sections, and a sealant of resilient material having two integrally connected portions respectively within said sections and having an axially extending opening for receiving and engaging the threaded shank of a bolt, one of said sections having a tubular portion provided at one end thereof with an outturned marginal flange and provided at the other end thereof with a laterally projecting concavoconvex annular portion, the other of said sections being a hollow cup sleeved upon said tubular portion, the side walls of said cup being polygonal in configuration and having inwardly projecting means engaging said marginal flange to retain said sections in assembled relation while permitting relative rotatable movement about a common axis, said cup having at the open end thereof a marginal flange seated upon the upper side of said annular portion and having at the closed end thereof means in registration with the axial opening aforesaid for receiving and threadedly engaging the threaded shank aforesaid of the bolt, one portion aforesaid of said sealant having a laterally projecting annular portion disposed in surface to surface relation with the underside of said annular portion for sealing engagement with an element to which said nut is bolted, the other portion of said sealant being anchored between said outturned marginal flange and the closed end of said cup.

2. A nut comprising two telescopically arranged relatively rotatable sheet metal sections, and a sealant of resilient material having two integrally connected portions respectively within said sections and having an axially extending opening for receiving and engaging the threaded shank of a bolt, one of said sections having a tubular portion provided at one end thereof with an outturned marginal flange and provided at the other end thereof with a laterally projecting annular portion, the other of said sections being a hollow cup sleeved upon said tubular portion, the side walls of said cup being polygonal in configuration and having inwardly projecting means engaging said marginal flange to retain said sections in assembled relation while permitting relative rotatable movement about a common axis, said cup having at the closed end thereof means in registration with the axial opening aforesaid for receiving and threadedly engaging the threaded shank aforesaid of the bolt, one portion aforesaid of said sealant having a laterally projecting annular portion disposed in surface to surface relation with the underside of said annular portion for sealing engagement with an element to which said nut is bolted, the other portion of said sealant being anchored between said outturned marginal flange and the closed end of said cup.

3. A nut comprising two telescopically arranged relatively rotatable sheet metal sections, and a sealant of resilient material having two integrally connected portions respectively within said sections and having an axially extending opening for receiving and engaging the threaded shank of a bolt, one of said sections having a tubular portion provided at one end thereof with an outturned marginal flange and provided at the other end thereof with a laterally projecting annular portion, the other of said sections being a hollow cup sleeved upon said tubular portion, the side walls of said cup being polygonal in configuration and having inwardly projecting means engaging said marginal flange to retain said sections in assembled relation while permitting relative rotatable movement about a common axis, said cup having at the closed end thereof means in registration with the axial opening aforesaid for receiving and threadedly engaging the threaded shank aforesaid of the bolt.

4. A nut comprising two telescopically arranged relatively rotatable sheet metal sections, and a sealant of resilient material having two integrally connected portions respectively within said sections and having an axially extending opening for receiving and engaging the threaded shank of a bolt, one of said sections having a tubular portion provided at one end thereof with an outturned marginal flange and provided at the other end thereof with a laterally projecting annular portion, the other of said sections being a hollow cup sleeved upon said tubular portion, the side walls of said cup being polygonal in configuration and having inwardly projecting means engaging said marginal flange to retain said sections in assembled relation while permitting relative rotatable movement about a common axis, said cup having at the closed end thereof means in registration with the axial opening aforesaid for receiving and threadedly engaging the threaded shank aforesaid of the bolt, one portion aforesaid of said sealant having a laterally projecting annular portion disposed in surface to surface relation with the underside of said annular portion for sealing engagement with an element to which said nut is bolted.

5. A nut comprising two telescopically arranged relatively rotatable sheet metal sections, and a sealant of resilient material having two integrally connected portions respectively within said sections and having an axially extending opening for receiving and engaging the threaded shank of a bolt, one of said sections having a tubular portion provided at one end thereof with an outturned marginal flange and provided at the other end thereof with a laterally projecting annular portion, the other of said sections being a hollow cup sleeved upon said tubular portion, the side walls of said cup being polygonal in configuration and having inwardly projecting means engaging said marginal flange to retain said sections in assembled relation while permitting relative rotatable movement about a common axis, said cup having at the closed end thereof means in registration with the axial opening aforesaid for receiving and threadedly engaging the threaded shank aforesaid of the bolt, one portion aforesaid of said sealant being anchored between said outturned marginal flange and the closed end of said cup.

References Cited in the file of this patent

UNITED STATES PATENTS

| | | |
|---|---|---|
| 918,367 | Rancillaz | Apr. 13, 1909 |
| 1,261,232 | Hibbard | Apr. 2, 1918 |
| 2,007,011 | Tinnerman | July 2, 1935 |
| 2,054,965 | Clo | Sept. 22, 1936 |
| 2,135,417 | Tinnerman | Nov. 1, 1938 |
| 2,225,654 | Olson | Dec. 24, 1940 |
| 2,284,081 | Beggs | May 26, 1942 |
| 2,448,232 | Muse | Aug. 31, 1948 |
| 2,494,882 | Kost | Jan. 17, 1950 |
| 2,734,547 | Hitchkin | Feb. 14, 1956 |
| 2,761,349 | Heller | Sept. 4, 1956 |

FOREIGN PATENTS

| | | |
|---|---|---|
| 1,315 | Great Britain | Feb. 23, 1901 |
| 823,368 | Germany | Dec. 3, 1951 |